(12) United States Patent
Yamaguma et al.

(10) Patent No.: US 10,156,002 B2
(45) Date of Patent: Dec. 18, 2018

(54) METHOD FOR RECOVERING SCANDIUM (71) Applicant: SUMITOMO METAL MINING CO., LTD., Tokyo (JP)

(72) Inventors: Ryoma Yamaguma, Niihama (JP); Tatsuya Higaki, Niihama (JP); Hidemasa Nagai, Niihama (JP); Satoshi Asano, Niihama (JP); Hiroshi Kobayashi, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 15/546,038

(22) PCT Filed: Dec. 8, 2015

(86) PCT No.: PCT/JP2015/084411
§ 371 (c)(1),
(2) Date: Jul. 25, 2017

(87) PCT Pub. No.: WO2016/125386
PCT Pub. Date: Aug. 11, 2016

(65) Prior Publication Data
US 2018/0023168 A1  Jan. 25, 2018

(30) Foreign Application Priority Data

Feb. 2, 2015 (JP) .................. 2015-018427

(51) Int. Cl.
| C22B 3/00 | (2006.01) |
| C22B 3/42 | (2006.01) |
| C22B 3/44 | (2006.01) |
| C22B 59/00 | (2006.01) |
| C22B 3/22 | (2006.01) |

(52) U.S. Cl.
CPC .............. *C22B 3/42* (2013.01); *C22B 3/22* (2013.01); *C22B 3/44* (2013.01); *C22B 59/00* (2013.01); *Y02P 10/234* (2015.11)

(58) Field of Classification Search
CPC ................................. C22B 59/00; C01F 17/00
USPC ...................... 423/21.1, 21.5, 263
See application file for complete search history.

(56) References Cited

U.S. PATENT DOCUMENTS

| 4,980,141 A * | 12/1990 | Kimura ............... C01F 17/0043 423/21.1 |
| 7,563,421 B2 | 7/2009 | Kobayashi et al. |
| 9,399,804 B2 | 7/2016 | Ozaki et al. |
| 2005/0265910 A1 | 12/2005 | Kobayashi et al. |
| 2016/0047014 A1 | 2/2016 | Ozaki et al. |
| 2016/0340757 A1 | 11/2016 | Higaki et al. |

FOREIGN PATENT DOCUMENTS

| CN | 101182601 A | 5/2008 |
| CN | 102030355 A | 4/2011 |
| EP | 3208352 A1 | 8/2017 |
| JP | 38-232026 A | 9/1996 |
| JP | 09-176756 * | 7/1997 |
| JP | 09-248463 A | 9/1997 |
| JP | 2000-313928 A | 11/2000 |
| JP | 2005-350766 A | 12/2005 |
| JP | 2014-177391 A | 9/2014 |
| JP | 2014-218719 A | 11/2014 |
| WO | 2014/094037 A1 | 6/2014 |
| WO | 2014/181721 A1 | 11/2014 |
| WO | 2015/115269 A1 | 8/2015 |

OTHER PUBLICATIONS

Partial translation of JP09-176756. (Year: 1997).*
Translation of Office action for CN 2015-80074157, dated Jan 26, 2018. (Year: 2018).*
Translation of CN 101182601 A, May 21, 2008. (Year: 2008).*
Translation of CN 102030355 A. (Year: 2011).*
Notification of Reasons for Refusal dated May 17, 2016, issued to JP Application No. 2015-018427.
International Search Report dated Feb. 23, 2016, issued for PCT/JP2015/084411.
Weiwei Wang et al., "Metallurgical processes for scandium recovery from various resources: A review", Hydrometallurgy, Mar. 17, 2011, vol. 108, pp. 100-108. (cited in the Aug. 23, 2017 AU Examination Report).
Examination Report dated Aug. 23, 2017, issued to AU Patent Application No. 2015381819.
Office Action dated Sep. 8, 2017, issued to KR Patent Application No. 10-2017-7020334.
Extended European Search Report dated Dec. 19, 2017, issued to EP Patent Application No. 15881203.2.
Office Action dated Jan. 26, 2018, issued to CN Patent Application No. 201580074157.1.

* cited by examiner

*Primary Examiner* — Steven J Bos
(74) *Attorney, Agent, or Firm* — Locke Lord LLP (57) ABSTRACT

Provided is a method for recovering scandium with which scandium can be efficiently recovered as high purity scandium oxide from a scandium-containing solution containing impurities such as iron without causing problems such as increased cost and safety problems. According to the method for recovering scandium according to the present invention, the pH of a solution containing scandium and iron (scandium-containing solution) is adjusted within the range of not less than −0.5 and less than 1, then scandium oxalate is obtained by adding the pH adjusted solution to an oxalic acid solution, and the scandium oxalate is roasted into scandium oxide.

3 Claims, 7 Drawing Sheets

METHOD FOR RECOVERING SCANDIUM

TECHNICAL FIELD

The present invention relates to a method for recovering scandium. More specifically, the present invention relates to a method for recovering scandium from a solution containing scandium and iron as high purity scandium oxide.

BACKGROUND ART

Scandium is an extremely valuable element as it is used as a high strength alloy by being added to aluminum or magnesium or as a stabilizer in the electrolyte of a fuel cell using zirconium.

Scandium has a particularly small ionic radius among the rare earth elements, and it has been thus known to be scarcely present in ordinary rare earth minerals but present in trace amounts in oxide ores of aluminum, tin, tungsten, zirconium, iron, nickel, and the like. However, scandium has not yet been used widely due to the small production quantity and high cost thereof.

In recent years, the high pressure acid leach (HPAL) process has been emerging as a practical method, in which nickel oxide ore is introduced into a pressure vessel along with sulfuric acid, and heated at a high temperature of about 240° C. to 260° C. to allow separation into a leachate containing nickel and a leach residue. In the HPAL process, for example, a neutralizing agent is added to the leachate obtained to separate and remove impurities, and then a sulfurizing agent such as hydrogen sulfide gas is added to the resulting leachate, allowing separation and recovery of nickel as a sulfide. The obtained nickel sulfide is subjected to a known nickel refinement process to be purified to a metal such as electric nickel or to a nickel salt compound such as nickel sulfate or nickel chloride.

In the HPAL process as described above, scandium contained in nickel oxide ore will be leached in a leachate along with nickel as described in Patent Document 1, but scandium is not precipitated by a series of treatments in which a neutralizing agent and a sulfurizing agent are added to the leachate but remains in the acidic solution after the sulfuration treatment and is separated from nickel.

However, scandium in the acidic solution is only contained at a dilute concentration of about several tens of mg/L, while impurities such as iron, aluminum, magnesium and the like are contained at higher concentrations. For this reason, the acidic solution containing scandium after sulfuration has been conventionally neutralized and disposed as wastewater sludge along with other impurities and has not been thus effectively used.

Accordingly, in order to enrich and refine scandium for effective utilization, for example, a method as disclosed in Patent Document 2 has been proposed. The method disclosed in Patent Document 2 is a method for recovering scandium which includes a leaching step of introducing nickel oxide ore containing scandium, aluminum, and chromium into a pressure vessel along with sulfuric acid and subjecting the nickel oxide ore to solid-liquid separation under high temperature and high pressure to obtain a leachate and a leach residue, a neutralization step of adding a neutralizing agent to the leachate to obtain a neutralized precipitate and a post-neutralization liquid, a sulfuration step of adding a sulfurizing agent to the post-neutralization liquid and separating it into nickel sulfide and a post-sulfuration liquid, an ion exchange step of adsorbing scandium to a chelating resin by bringing the post-sulfuration liquid into contact with the chelating resin to obtain a scandium eluate, a solvent extracting step of bringing the scandium eluate into contact with an extractant to obtain a backward extraction liquid, a scandium precipitating step of adding a neutralizing agent or oxalic acid to the backward extraction liquid to obtain a precipitate, and a roasting step of drying and roasting the precipitate to obtain scandium oxide.

According to such a method in which an ion exchange method and a solvent extraction method are combined, it is possible to efficiently recover scandium.

However, in this method, a scandium hydroxide or scandium oxalate precipitate is obtained by adding a neutralizing agent or oxalic acid to a solution containing scandium. Some or most of impurity metals such as aluminum and iron contained in the solution are also crystallized at the same time in the method for crystallizing scandium as a hydroxide. This makes selective separation of scandium difficult. Further, a hydroxide of scandium to be obtained takes a gel form, resulting in poor handling properties such as long filtering time.

Meanwhile, a reaction (hereinafter, simply referred to as the "oxalate-formation") to obtain an oxalate salt of scandium by adding oxalic acid ($(COOH)_2$) to the solution containing scandium has an advantage of better handling properties such as filterability.

In addition, Patent Document 3 discloses a method for producing high purity scandium triflate in which the pH of a low purity scandium compound-containing aqueous solution is adjusted to 0.5 to 4.0, scandium is then recovered as scandium oxalate by adding oxalic acid (salt) to the solution, the scandium oxalate is calcined to be converted into scandium oxide, the scandium oxide is dissolved in and reacted with trifluoromethanesulfonic acid to obtain a scandium triflate aqueous solution.

However, in the case of using the treatment method by oxalate-formation shown in Patent Document 2 and Patent Document 3, there are problems that the scandium-containing acidic solution of sulfuric acid contains a large amount of aluminum ions and ferrous (II) ions and the precipitation of aluminum oxalate and ferrous oxalate (II) also occurs at the same time. This is because the solubility of ferrous oxalate (II) in water is as low as 0.022 g/100 g.

In order to prevent the precipitation of ferrous oxalate (II), a method is used in which an oxidizing agent such as hydrogen peroxide is added to the solution so that the oxidation-reduction potential (ORP) of the solution is about 700 mV at the potential using the silver-silver chloride electrode as a reference electrode to oxidize ferrous (II) to ferric (III), and ferric oxalate (III) having high solubility in water is generated, thereby preventing precipitation of ferrous oxalate (II).

Such a method for generating ferric oxalate (III) can exert a sufficient effect when the iron ion concentration is lower than the scandium concentration. However, it is required to add a larger amount of oxidizing agent as the iron ion concentration increases. In addition, in order to oxidize ferrous (II) until the oxidation-reduction potential reaches about 700 mV, an oxidizing agent such as hydrogen peroxide or ozone which has a strong oxidizing power is required, and this increases costs and causes various problems such as durability of facilities and safety of handling. Meanwhile, when the addition of oxidizing agent is insufficient, precipitation of an oxalate occurs, resulting in a decreased grade of scandium and unstable operation.

Accordingly, in order to increase the solubility of each impurity, a method is conceivable in which the addition amount of oxalic acid is increased to be equal to or more than the equivalent amount required for the oxidation of scandium or the impurity metal concentration is decreased by diluting the starting liquid. However, it is not an advisable plan to perform such a treatment since the capacity of equipment required and the investment cost increase.

As described above, a method for efficiently recovering scandium from a solution containing a large amount of iron and aluminum ions has not been proposed, and it has been difficult to easily obtain high purity scandium which hardly contains such impurities.

Patent Document 1: Japanese Unexamined Patent Application, Publication No. 2000-313928
Patent Document 2: PCT International Publication No. WO2014/181721
Patent Document 3: Japanese Unexamined Patent Application, Publication No. H09-248463
Patent Document 4: Japanese Unexamined Patent Application, Publication No. 2005-350766

DISCLOSURE OF THE INVENTION

Problems to be Solved by the Invention

The present invention is made in view of the above actual circumstances. An object of the present invention is to provide a method for recovering scandium, in which scandium is efficiently recovered from a scandium-containing solution containing impurities of iron and aluminum ions as high purity scandium oxide without causing problems such as an increase in cost and safety.

Means for Solving the Problems

The present inventors have conducted extensive studies to solve the aforementioned problems. As a result, the present inventors have found out that crystals of high grade scandium oxalate can be precipitated by adding a scandium-containing solution adjusted to have a pH in a specific range to an oxalic acid solution filled in a reaction vessel and high purity scandium oxide can be obtained by roasting the crystals. Then the present invention has been completed. That is, the present invention can provide the following.

(1) A first embodiment of the present invention provides a method for recovering scandium including: adjusting a pH of a solution containing scandium and iron (scandium-containing solution) to a range between −0.5 or more and less than 1; adding the solution after the pH adjustment to an oxalic acid solution to obtain scandium oxalate; and roasting the scandium oxalate to convert the scandium oxalate into scandium oxide.

(2) A second embodiment of the present invention provides the method for recovering scandium according to the first embodiment, in which the scandium-containing solution is obtained by subjecting a solution containing scandium to an ion exchange treatment and a solvent extraction treatment.

Effects of the Invention

According to the present invention, scandium can be efficiently recovered as high purity scandium oxide without requiring an oxidizing agent and capital investment and material cost.

PREFERRED MODE FOR CARRYING OUT THE INVENTION

Below, specific embodiments of the present invention (hereinafter referred to as the "present embodiments") will be described in more detail with reference to the drawings. Note that the present invention shall not be limited to these and can be implemented with appropriate modifications made without departing from the spirit of the present invention.

<<1. Overview>>

The method for recovering scandium according to the present embodiment is a method for recovering scandium from an acidic solution containing scandium and iron as scandium oxide.

Specifically, in the method for recovering scandium according to the present embodiment, the pH of a solution containing scandium and iron (hereinafter also referred to as the "scandium-containing solution") is adjusted to a range between −0.5 or more and less than 1, subsequently the solution after the pH adjustment is added to an oxalic acid solution to obtain scandium oxalate, and the scandium oxalate obtained is roasted to be converted into scandium oxide.

Here, as the solution containing scandium and iron (scandium-containing solution), a solution obtained by separating nickel from a leachate obtained by the high pressure acid leaching (HPAL) treatment of nickel oxide ore with a sulfuration treatment using a sulfurizing agent and subjecting the post-sulfuration liquid thus obtained to an ion exchange treatment and a solvent extraction treatment to separate impurities therefrom and to enrich the liquid can be used. Note that scandium can be left in the solution while nickel is converted into a sulfide by a sulfuration treatment in the HPAL process and nickel and scandium can be thus effectively separated.

In the present embodiment, an oxalate salt from which impurities, particularly iron is effectively separated, namely, the crystal of scandium oxalate (crystallization step (oxalate-formation step)) is obtained by using such a scandium-containing solution and adding this to an oxalic acid solution and high purity scandium oxide is obtained by roasting the crystal (roasting step).

In particular, in the method for recovering scandium according to the present embodiment, in the crystallization step in which the oxalate-formation treatment is performed, the crystal of scandium oxalate is obtained by a so-called reversed addition method in which a scandium-containing solution of which the pH is adjusted to a specific range is added to an oxalic acid solution filled in a reaction vessel instead of adding the oxalic acid solution to the scandium-containing solution as in a conventional method. By generating crystals of scandium oxalate based on such a method, high purity scandium can be obtained without using an oxidizing agent.

<<2. Method for Recovering Scandium>>

Each step of the method for recovering scandium according to the present embodiment will be specifically described with reference to the drawings.

<2-1. Hydrometallurgy Process of Nickel Oxide Ore>

In the method for recovering scandium according to the present embodiment, as described above, a solution obtained by separating nickel from a leachate obtained by the high pressure acid leaching (HPAL) treatment of nickel oxide ore as a sulfide and subjecting the solution thus obtained to an ion exchange treatment and a solvent extraction treatment to remove impurities therefrom can be used as the solution containing scandium and iron (scandium-containing solution). Below, the hydrometallurgy process of nickel oxide ore for obtaining a scandium-containing solution to be a starting material will be described first.

Figure 1:
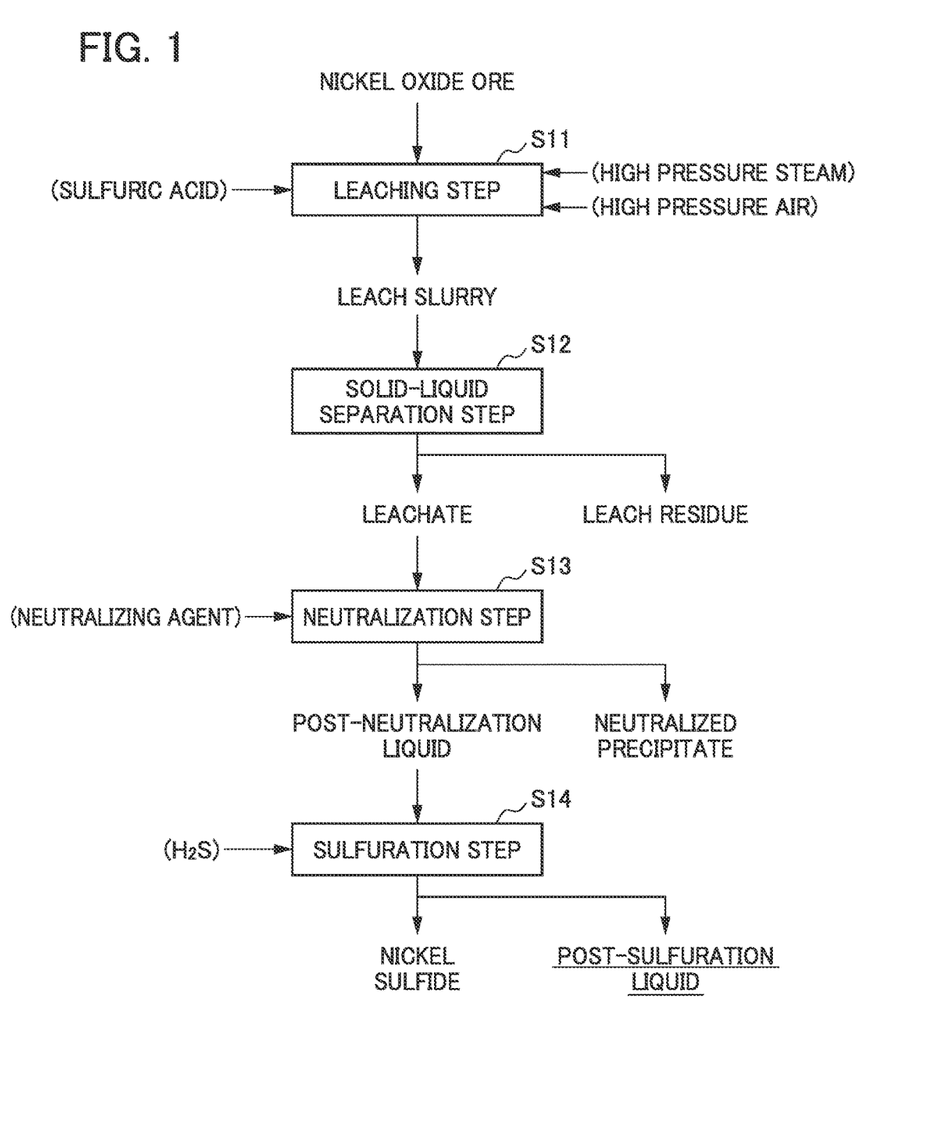
FIG. 1 is a flow diagram for illustrating the flow of a hydrometallurgy process of nickel oxide ore.

FIG. 1 is a flow diagram for illustrating the flow of a hydrometallurgy process of nickel oxide ore. As illustrated in FIG. 1, the hydrometallurgy process of nickel oxide ore includes a leaching step S11 of leaching nickel oxide ore with sulfuric acid under high temperature and high pressure to obtain a leach slurry; a solid-liquid separation step S12 of performing solid-liquid separation to separate the leach slurry into a leachate and a leach residue; a neutralization step S13 of adding a neutralizing agent to the leachate to obtain a neutralized precipitate containing impurities and a post-neutralization liquid; and a sulfuration step S14 of adding a sulfurizing agent to the post-neutralization liquid to obtain nickel sulfide and a post-sulfuration liquid.

(1) Leaching Step

The leaching step S11 comprises adding sulfuric acid to a slurry of nickel oxide ore, for example, in a high temperature pressurized vessel (an autoclave) and the like, supplying high pressure steam and high pressure air into the vessel, and stirring the slurry at a temperature of 240° C. to 260° C. to generate a leach slurry comprising a leachate containing nickel and a leach residue containing hematite. Note that scandium is contained in the leachate along with nickel.

Here, examples of nickel oxide ore mainly include so-called laterite ore such as limonite ore and saprolite ore. The content of nickel in laterite ore is usually 0.8 to 2.5 wt %, and nickel is contained as a hydroxide or a silica magnesia (magnesium silicate) mineral. Further, these types of nickel oxide ore contain scandium.

(2) Solid-Liquid Separation Step

The solid-liquid separation step S12 comprises performing solid-liquid separation of the leach slurry generated in the leaching step S11 described above into a leachate containing nickel and cobalt and the leach residue of hematite by multi-stage washing.

In this solid-liquid separation step S12, the leach slurry is mixed with a washing liquid, and then solid-liquid separation is performed by using a solid-liquid separation apparatus such as a thickener. Specifically, the leach slurry is first diluted with the washing liquid, and then the leach residue in the slurry is condensed as a precipitate in the thickener. This decreases the amount of nickel attached to the leach residue according to the degree of dilution. In actual operation, thickeners having such a function are used by being connected in multiple stages.

(3) Neutralization Step

The neutralization step S13 comprises adding a neutralizing agent to the leachate to adjust the pH, thereby obtaining a neutralized precipitate containing impurity elements and a post-neutralization liquid. By the neutralization treatment in this neutralization step S13, valuable metals such as nickel, cobalt, and scandium will be contained in the post-neutralization liquid while most impurities including aluminum will be contained in the neutralized precipitate.

In the neutralization step S13, publicly known substances may be used as the neutralizing agent including, for example, limestone, slaked lime, sodium hydroxide, and the like. Further, in the neutralization treatment, the pH is preferably adjusted to the range of 1 to 4, more preferably to the range of 1.5 to 2.5 while suppressing oxidation of the leachate separated. When the pH is less than 1, neutralization may be insufficient, and the neutralized precipitate and the post-neutralization liquid may not be separated. Meanwhile, when the pH is more than 4, not only impurities including aluminum but also valuable metals such as scandium and nickel may be contained in the neutralized precipitate.

(4) Sulfuration Step

The sulfuration step S14 comprises adding a sulfurizing agent to the post-neutralization liquid obtained from the aforementioned neutralization step S13 to obtain nickel sulfide and a post-sulfuration liquid. Nickel, cobalt, zinc, and the like are recovered as sulfides and scandium and the like remain in the post-sulfuration liquid by the sulfuration treatment in this sulfuration step S14. Therefore, nickel and scandium can be effectively separated by the sulfuration treatment in this hydrometallurgy process of nickel oxide ore.

Specifically, in the sulfuration step S14, a sulfurizing agent such as gaseous hydrogen sulfide, sodium sulfide, or hydrogenated sodium sulfide is blown into the resulting post-neutralization liquid to generate a sulfide comprising nickel (nickel sulfide) with less impurity components; and a post-sulfuration liquid having a low and stabilized level of nickel concentration and containing scandium and the like.

In the sulfuration treatment of the sulfuration step S14, separation treatment of a slurry of nickel sulfide is performed using a sedimentation apparatus such as a thickener to separate and recover nickel sulfide from the bottom of the thickener. Meanwhile, the post-sulfuration liquid as an aqueous solution component is overflown for recovery.

In the method for recovering scandium according to the present embodiment, for example, a solution (solution containing scandium and iron) obtained by recovering the post-sulfuration liquid of an acidic solution of sulfuric acid obtained through each step in the hydrometallurgy process of nickel oxide ore as described above and subjecting the post-sulfuration liquid to an ion exchange treatment and a solvent extraction treatment to be described later is used as a starting material to generate scandium oxide.

<2-2. Ion Exchange Treatment and Solvent Extraction Treatment>

In the method for recovering scandium according to the present embodiment, as a solution containing scandium and iron, a solution obtained by subjecting the post-sulfuration liquid obtained through the sulfuration step in the hydrometallurgy process of nickel oxide ore to an ion exchange treatment and a solvent extraction treatment may be used. It is possible to separate and remove impurities and enrich scandium by subjecting the post-sulfuration liquid to an ion exchange treatment and a solvent extraction treatment in this way. Below, each of the ion exchange treatment and the solvent extraction treatment will be described.

(1) Ion Exchange Treatment

The post-sulfuration liquid contains aluminum, chromium, and the like as impurities. Accordingly, it is preferable to remove these impurities and to enrich scandium when recovering scandium in the solution as scandium oxide. Examples of the method for enriching scandium include a method by an ion exchange treatment using a chelating resin.

Figure 2:
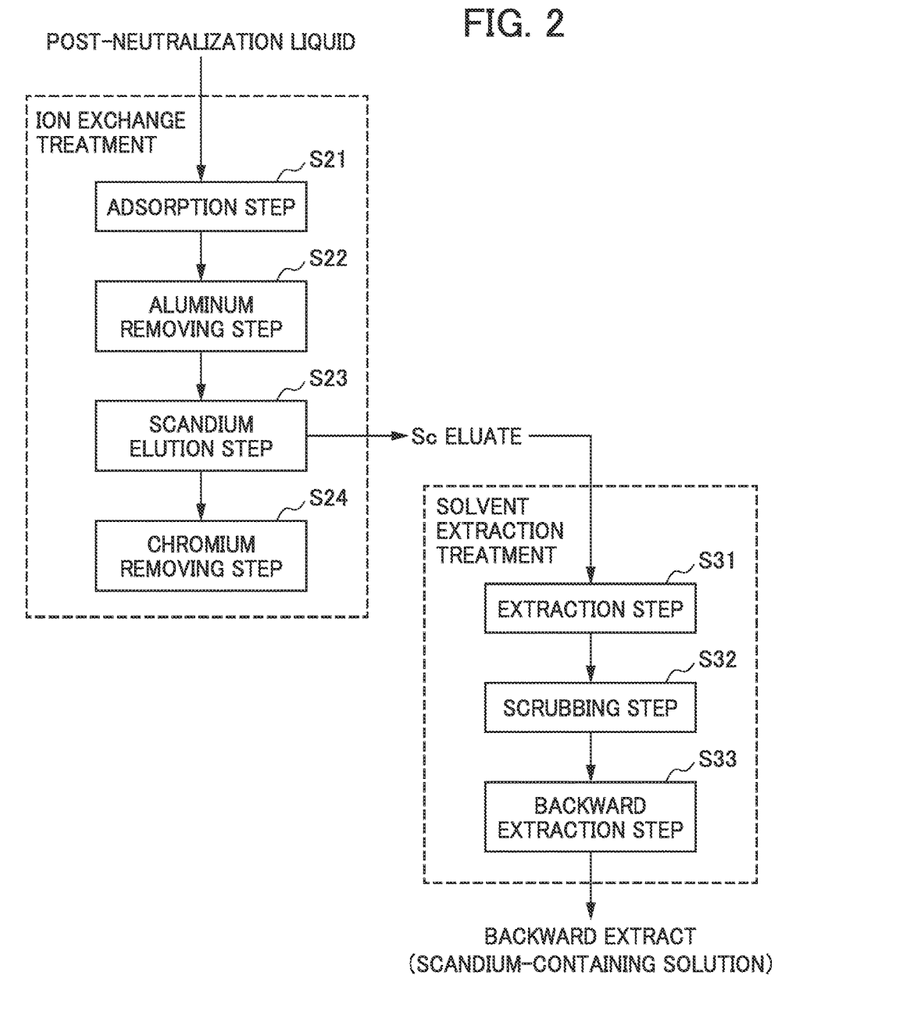
FIG. 2 is a flow diagram for illustrating the flow of an ion exchange treatment using a chelating resin.

FIG. 2 is a flow diagram for illustrating the flow of an ion exchange treatment using a chelating resin. Note that the flow until the scandium eluate obtained by the ion exchange treatment is subjected to the solvent extraction treatment is also illustrated in this FIG. 2. In the ion exchange treatment of which an example is illustrated in FIG. 2, the post-sulfuration liquid obtained through the sulfuration step S14 (FIG. 1) in the hydrometallurgy process of nickel oxide ore is brought into contact with a chelating resin to adsorb scandium in the post-sulfuration liquid to the chelating resin and to obtain a scandium (Sc) eluate.

There is no particular limitation for the aspect (each step) of the ion exchange treatment, but as illustrated in FIG. 2, examples of the ion exchange treatment include a treatment comprising: an adsorption step S21 of bringing the post-sulfuration liquid into contact with a chelating resin to allow scandium to be adsorbed by the chelating resin; an aluminum removing step S22 of allowing sulfuric acid to make contact with the chelating resin to remove aluminum adsorbed by the chelating resin; a scandium elution step S23 of allowing sulfuric acid to come into contact with the chelating resin which has been subjected to the aluminum removing step S22 to obtain a scandium eluate; and a chromium removing step S24 of allowing sulfuric acid to come into contact with the chelating resin which has been subjected to the scandium elution step S23 to remove chromium which has been adsorbed by the chelating resin in the adsorption step S21. Below, an overview of each step will be described.

[Adsorption Step]

In the adsorption step S21, the post-sulfuration liquid is brought into contact with a chelating resin to allow scandium to be adsorbed by the chelating resin. There is no particular limitation for the type of the chelating resin, and for example, a resin having iminodiacetic acid as a functional group can be used.

[Aluminum Removing Step]

In the aluminum removing step S22, the chelating resin which has adsorbed scandium in the adsorption step S21 is brought into contact with 0.1 N or less of sulfuric acid to remove aluminum adsorbed by the chelating resin. Note that when removing aluminum, the pH is preferably maintained in the range of between 1 or more and 2.5 or less, and more preferably maintained in the range of between 1.5 or more and 2.0 or less.

[Scandium Elution Step]

In the scandium elution step S23, the chelating resin which has been subjected to the aluminum removing step S22 is brought into contact with 0.3 N or more and less than 3 N of sulfuric acid to obtain a scandium eluate. When obtaining the scandium eluate, the normality of sulfuric acid used as an eluent is preferably maintained in the range of between 0.3 N or more and less than 3 N, and more preferably maintained in the range of between 0.5 N or more and less than 2 N.

[Chromium Removing Step]

In the chromium removing step S24, the chelating resin which has been subjected to the scandium elution step S23 is brought into contact with 3 N or more of sulfuric acid to remove chromium which has been adsorbed by the chelating resin. A normality of sulfuric acid used as an eluent of less than 3 N is not preferred when removing chromium because chromium may not be removed properly from the chelating resin.

By such an ion exchange treatment, it is possible to obtain a scandium eluate from which impurities such as aluminum and chromium are removed and in which scandium is enriched. Note that it is possible to increase the concentration of the scandium eluate by repeatedly subjecting the resulting scandium eluate to the same ion exchange treatment. The concentration of scandium to be recovered increases as the number of repetitions increases, but the number of repetitions is industrially preferably about 8 times or less as the degree of increase in concentration of scandium to be recovered decreases even if the ion exchange treatment is repeated too many times.

(2) Solvent Extraction Treatment

In the solvent extraction treatment, the scandium (Sc) eluate obtained through the ion exchange treatment described above is allowed to come into contact with an extractant to obtain an extraction liquid and a backward extractant is added to the obtained extraction liquid to obtain a backward extract containing scandium. There is no particular limitation for the aspect (each step) of the solvent extraction treatment, but examples thereof include a treatment comprising: an extraction step S31 of mixing the scandium eluate with an extractant and separating the mixture into a post-extraction organic solvent into which scandium has been extracted and a raffinate liquid; a scrubbing step S32 of mixing the post-extraction organic solvent with a hydrochloric acid solution or a sulfuric acid solution to separate impurities from the post-extraction organic solvent and to obtain a post-washing organic solvent; and a backward extraction step S33 of mixing the post-washing organic solvent with a backward extraction starting liquid to perform backward extraction of scandium from the post-washing organic solvent and to obtain a backward extraction liquid. By performing the solvent extraction treatment in this way, it is possible to further increase the purity of scandium contained in the scandium eluate.

[Extraction Step]

In the extraction step S31, a scandium eluate is mixed with an organic solvent containing an extractant to selectively extract scandium into the organic solvent. There is no particular limitation for the extractant, but it is preferable to use a solvation extractant containing phosphorus, specifically, one having trioctylphosphine oxide (TOPO) as a functional group, from the viewpoint of selectivity for scandium. There are various trialkylphosphine oxides having different alkyl chains in trioctylphosphine oxide, but any of them can be suitably used. Note that it is preferable to use the extractant after dilution with, for example, a hydrocarbon-based organic solvent at the time of extraction.

[Scrubbing (Washing) Step]

Although it is not an essential aspect, it is preferable to subject the organic solvent (organic phase) to a scrubbing (washing) treatment to separate the impurity elements into the aqueous phase and to remove them from the extractant prior to the backward extraction of the extraction liquid (scrubbing step S32).

For a solution (washing solution) used for scrubbing, a hydrochloric acid solution or a sulfuric acid solution can be used. When a hydrochloric acid solution is used, a concentration range of between 2.0 mol/L or more and 9.0 mol/L or less is preferable, and when a sulfuric acid solution is used, a concentration range of between 3.5 mol/L or more and 9.0 mol/L or less is preferable.

[Backward Extraction Step]

In the backward extraction step S33, scandium is backward-extracted from the organic solvent into which scandium has been extracted. In this backward extraction step S33, water or an acid solution at a low concentration as the backward extraction solution (the backward extraction starting liquid) is mixed with an organic solvent to allow a reaction opposite to that at the time of the extraction to proceed and to obtain a post-backward extraction liquid (backward extract) containing scandium.

Water may be used as the backward extraction starting liquid, but phase separation from the organic phase may be poor. Therefore, it is preferable to use an acid solution at a low concentration as the backward extraction starting liquid. As the acid solution, a sulfuric acid solution having a concentration of about less than 3.5 mol/L is used.

<2-3. Oxalate-Formation Treatment>

The scandium-containing solution, which is a backward extract obtained through the solvent extraction treatment described above, is subjected to an oxalate-formation treatment to convert scandium into an oxalate salt (scandium oxalate). By converting scandium into an oxalate salt in this way, it is possible to improve handling properties such as filterability and to efficiently recover scandium.

Here, in the oxalate-formation treatment, it is important to prevent the influence of divalent iron ions remaining in the scandium-containing solution at a high concentration. When divalent iron ions are contained in the solution, precipitation of ferrous oxalate (II) along with an oxalate salt of scandium also simultaneously occurs in the oxalate-formation treatment, and it is thus difficult to selectively and efficiently recover scandium.

Figure 3:
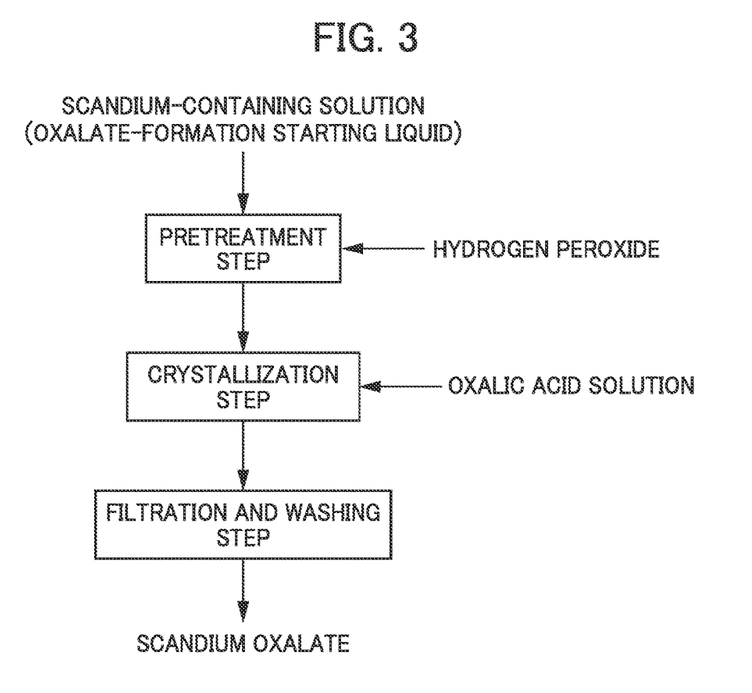
FIG. 3 is a flow diagram for illustrating the flow of a conventional oxalate-formation treatment.

Conventionally, in the oxalate-formation treatment to convert scandium into an oxalate salt, in order to prevent precipitation of ferrous oxalate (II) based on the divalent iron ions contained in the scandium-containing solution (oxalate-formation starting liquid), a method has been generally used in which an oxidizing agent is added to the scandium-containing solution to control the oxidation-reduction potential (ORP) and to oxidize the solution and an oxalic acid solution is added to the oxidized solution. Specifically, for example, as illustrated in FIG. 3, first, an oxidizing agent such as hydrogen peroxide is added to a scandium-containing solution which is an oxalate-formation starting liquid to control the ORP to a predetermined value and to oxidize the solution (pretreatment step). By this pretreatment step, divalent iron ions are oxidized to trivalent iron ions. Thereafter, an oxalic acid solution is added to the solution of which the ORP is controlled to crystallize an oxalate salt of scandium (crystallization step). Note that the crystallized scandium oxalate can be recovered through a filtration and washing treatment (filtration and washing step).

In this way, conventionally, prior to precipitating crystals of an oxalate salt by adding an oxalic acid solution to the solution, the solution is subjected to the oxalate-formation treatment to convert the divalent iron ions into trivalent iron ions so as to generate ferric oxalate (III) having high solubility and to suppress the formation of ferrous oxalate (II). However, in the oxalate-formation treatment, it is required to prepare an expensive oxidizing agent such as hydrogen peroxide having a strong oxidizing power, and thus an increase in cost is caused and equipment durable to the high oxidizing power is required.

Meanwhile, the present inventors have found out that it is possible to effectively prevent the generation of a precipitate of ferrous oxalate (II) based on the divalent iron ions contained in the solution by using a method in which a scandium-containing solution adjusted to have a specific pH range is added to a large amount of "oxalic acid solution" filled in a reaction vessel (reaction tank) even when the concentration of iron, which is an impurity in the oxalate-formation starting liquid (scandium-containing solution), is high.

That is, in the method for recovering scandium according to the present embodiment, the pH of a solution containing scandium and iron (scandium-containing solution) is adjusted to a range of between −0.5 or more and less than 1 and then after the pH adjustment the solution is added to the oxalic acid solution filled in the reaction vessel to generate scandium oxalate.

Figure 4:
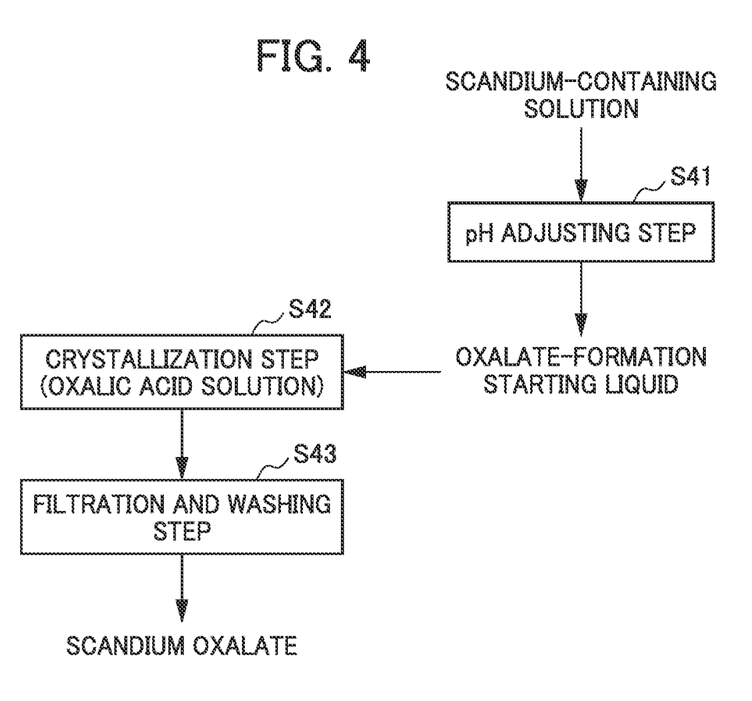
FIG. 4 is a flow diagram for illustrating the flow of an oxalate-formation treatment (present invention).

FIG. 4 is a flow diagram for illustrating the oxalate-formation treatment in the present embodiment. As described above, in the present embodiment, the oxalate-formation treatment comprises a pH adjusting step S41 of adjusting the pH of the scandium-containing solution to a specific range, that is, a range of between −0.5 or more and less than 1 and a crystallization step S42 of adding a solution (oxalate-formation starting liquid) of which the pH is adjusted and maintained to the oxalic acid solution filled in the reaction vessel to cause precipitation of an oxalate salt of scandium. Note that the crystals of scandium oxalate obtained are recovered through a filtration and washing step S43 to perform a filtration and washing treatment.

In the pH adjusting step S41, a strongly acidic pH adjusting agent such as sulfuric acid is added to the scandium-containing solution containing scandium and iron to adjust the pH of the solution to a range of between −0.5 or more and less than 1. When the pH of the solution is 1 or more, precipitates of impurities such as divalent iron ions and aluminum ions contained in the solution may be generated. Meanwhile, the pH is in an extremely strong acidic region of less than − (minus) 0.5, the solubility of scandium oxalate to be crystallized in the crystallization step S42 of the next step increases, the amount obtained as crystals decreases, and the yield decreases.

In the crystallization step S42, as described above, an oxalate of scandium (crystal of scandium oxalate) is generated by adding a scandium-containing solution (an oxalate-formation starting liquid), of which the pH is controlled and maintained in the range of between −0.5 or more and less than 1, into the oxalic acid solution. In this crystallization step S42, first, the oxalic acid solution is put in a reaction vessel, and then a scandium-containing solution having a pH controlled is added into the oxalic acid solution filled in the reaction vessel. In this way, in the present embodiment, the method for adding the scandium-containing solution is important and the scandium-containing solution is added into the "oxalic acid solution" instead of adding the oxalic acid solution into the scandium-containing solution unlike in the conventional method.

According to such a method, it is possible to effectively prevent generation of a precipitate such as ferrous oxalate (II) without performing a pretreatment step of adding an oxidizing agent such as hydrogen peroxide and performing an oxidation treatment in the conventional method. That is, it is possible to efficiently decrease the concentration of impurities such as iron in the crystals of scandium oxalate to be generated at low cost without requiring an expensive oxidizing agent or more durable equipment, and as a result, high purity scandium can be recovered.

<2-4. Generation of Scandium Oxide (Roasting)>

In the present embodiment, the crystals of scandium oxalate obtained by performing the oxalate-formation treatment as described above are converted into scandium oxide by roasting.

The roasting treatment is a treatment in which the crystals of scandium oxalate obtained by the oxalate-formation treatment are washed with water, dried, and then roasted. Scandium can be recovered as scandium oxide via this roasting treatment. In particular, in the present embodiment, it is possible to precipitate crystals in which contamination of impurities including the generation of ferrous oxalate (II) is suppressed by adding a scandium-containing solution adjusted to have a specific pH range to an "oxalic acid solution" to precipitate crystals of scandium oxalate in the oxalate-formation treatment described above. Therefore, high purity scandium oxide can be obtained by roasting the crystals of scandium oxalate.

There is no particular limitation for the conditions of the roasting treatment, but for example, heating in a tubular furnace at about 900° C. for about 2 hours may be used. Note that a continuous furnace such as a rotary kiln is preferably used for industrial production because both drying and roasting can be performed with the same equipment.

EXAMPLES

Below, the present invention will be described in more detail with reference to Examples and Comparative Examples. However, the present invention shall not in any sense be limited to these Examples.

Example 1

Nickel oxide ore as a raw material was subjected to a known HPAL process to obtain a leachate containing leached nickel or scandium. A slaked lime slurry was added to the leachate obtained to separate impurities. Subsequently, hydrogen sulfide gas as a sulfurizing agent was added to the leachate from which the impurities had been separated and the sulfuration treatment was performed to separate nickel as a sulfide.

Next, the solution after the sulfuration treatment (post-sulfuration liquid) was adsorbed to a chelating resin having iminodiacetic acid as a functional group to perform a known ion exchange treatment. Further, the scandium eluate obtained by this ion exchange treatment was subjected to a known solvent extraction treatment using an extractant having trioctylphosphine oxide (TOPO) as a functional group. Scandium in the solution was enriched by such a combination of the ion exchange treatment and the solvent extraction treatment to obtain a scandium-containing solution having the composition shown in the following Table 1. As shown in Table 1, the scandium-containing solution contains impurities such as iron and aluminum in addition to scandium being a target for recovery.

TABLE 1

| Composition of scandium-containing solution [g/L] | | | | |
|---|---|---|---|---|
| Sc | Fe | Al | Ni | Cr |
| 10.0 | 0.4 | 2.5 | 0.07 | 0.08 |

Next, sulfuric acid was added to the scandium-containing solution to adjust the pH to 0, and this solution was maintained in the room temperature range of 25 to 30° C. Note that the pH of the scandium-containing solution before the pH adjustment was 1, and the oxidation-reduction potential (ORP) was in the range of 500 mV to 550 mV as measured using a silver-silver chloride electrode as the reference electrode.

Next, the scandium-containing solution after the pH adjustment was added to a reaction tank filled with an oxalic acid solution having an oxalic acid concentration of 100 g/L and was allowed to react over 1 hour while stirring (oxalate-formation treatment).

Here, in the oxalate-formation treatment, the amount of oxalic acid $((COOH)_2)$ required to convert scandium (Sc) into scandium oxalate $(Sc_2(C_2O_4))$ was defined as 1 equivalence, and the amount of the oxalic acid solution filled in the reaction tank was changed to be in the range of 1.4 equivalence to 2.0 equivalence, that is, 1.4, 1.6, 1.7, and 2.0 equivalences of scandium contained in the scandium-containing solution to be added.

After the oxalate-formation treatment, the resulting precipitate was filtered and separated into a precipitate and a filtrate. The separated precipitate was washed with pure water and vacuum dried to obtain crystals of scandium oxalate. Thereafter, the resulting crystals of scandium oxalate were placed in a tubular furnace and roasted by a known method to obtain scandium oxide $(Sc_2O_3)$.

For each scandium oxide obtained by changing the amount of the oxalic acid solution in the oxalate-formation treatment, the metal concentration was measured by ICP atomic absorption spectroscopy. Note that the grade of scandium oxide was calculated from the analytical value of scandium. Measurement results are shown in Table 2.

TABLE 2

| Measurement of metal concentration in scandium oxide | | | | |
|---|---|---|---|---|
| Amount of oxalic acid solution (Equivalence) | 1.4 | 1.6 | 1.7 | 2.0 |
| $Sc_2O_3$ [wt %] | 99.94 | 99.92 | 99.93 | 99.92 |
| Fe [ppm] | 14 | 29 | 43 | 29 |
| Al [ppm] | 9 | 9 | 13 | 9 |

As shown in Table 2, in Example 1, it was possible to suppress the grade of iron to 43 ppm or less and the grade of aluminum to 13 ppm or less in each scandium oxide, and it was possible to obtain high purity scandium oxide with a grade of more than 99.9%.

Example 2

The same scandium-containing solution (having a composition shown in Table 1) as in Example 1 was used, the pH of the solution was adjusted to 0.5, and then the scandium-containing solution was added to an oxalic acid solution of which the amount was adjusted to be 1.5 equivalence of scandium contained in the scandium-containing solution.

After completion of the oxalate-formation treatment, scandium oxide was obtained by roasting the resulting crystals of scandium oxalate. In the same manner as in Example 1, the metal concentration in the resulting scandium oxide was measured. Measurement results are shown in Table 3.

TABLE 3

Measurement of metal concentration in scandium oxide

| Amount of oxalic acid solution (Equivalence) | 1.5 |
|---|---|
| $Sc_2O_3$[wt %] | 99.91 |
| Fe[ppm] | 57 |
| Al [ppm] | 11 |

Figure 5:
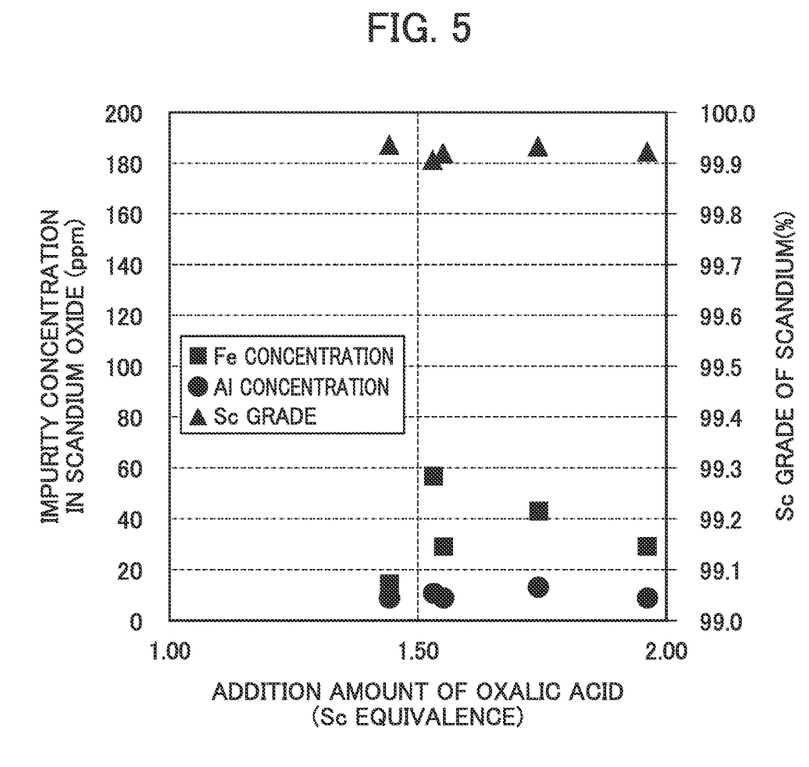
FIG. 5 is a graphic representation showing the measurement results of the impurity concentration with respect to the addition amount of oxalic acid and the grade of scandium for scandium oxide obtained in Examples 1 and 2.

As shown in Table 3, it was possible to suppress the grade of iron to 57 ppm and the grade of aluminum to 11 ppm, and it was possible to obtain high purity scandium oxide with a grade of more than 99.9%. Note that a graphic representation showing the measurement results of the impurity concentration with respect to the addition amount of oxalic acid (Sc equivalence) and the grade of scandium for scandium oxide obtained in Examples 1 and 2 is illustrated in FIG. 5.

Comparative Example 1

The same scandium-containing solution (having a composition shown in Table 1) as in Example 1 was used, hydrogen peroxide was added to the solution, and the oxidation treatment was performed at room temperature until the ORP exceeded a potential of 700 mV using the silver-silver chloride electrode as a reference electrode. Note that, in Comparative Example 1, hydrogen peroxide of an expensive oxidizing agent was used for the oxidation treatment, and the total cost of scandium recovery thus increased.

Next, the scandium-containing solution after the oxidation treatment was filled in a reaction tank, an oxalic acid solution having the same concentration as in Example 1 was added to this in an amount being 1.5, 1.6, and 1.7 equivalences of scandium in the scandium-containing solution, and the mixture was stirred for 1 hour (oxalate-formation treatment (flow diagram of FIG. 3)).

After the oxalate-formation treatment, the resulting precipitate was filtered and separated into a precipitate and a filtrate. The resulting crystals of scandium oxalate were washed, dried, and then roasted in the same manner as in Example 1 to obtain scandium oxide. In the same manner as in Example 1, the metal concentration in the resulting scandium oxide was measured. Measurement results are shown in Table 4.

TABLE 4

Measurement of metal concentration in scandium oxide

| Amount of oxalic acid solution (Equivalence) | 1.5 | 1.6 | 1.7 |
|---|---|---|---|
| $Sc_2O_3$[wt %] | 99.93 | 99.84 | 99.86 |
| Fe[ppm] | 99 | 99 | 86 |
| Al [ppm] | 9 | 19 | 19 |

Figure 6:
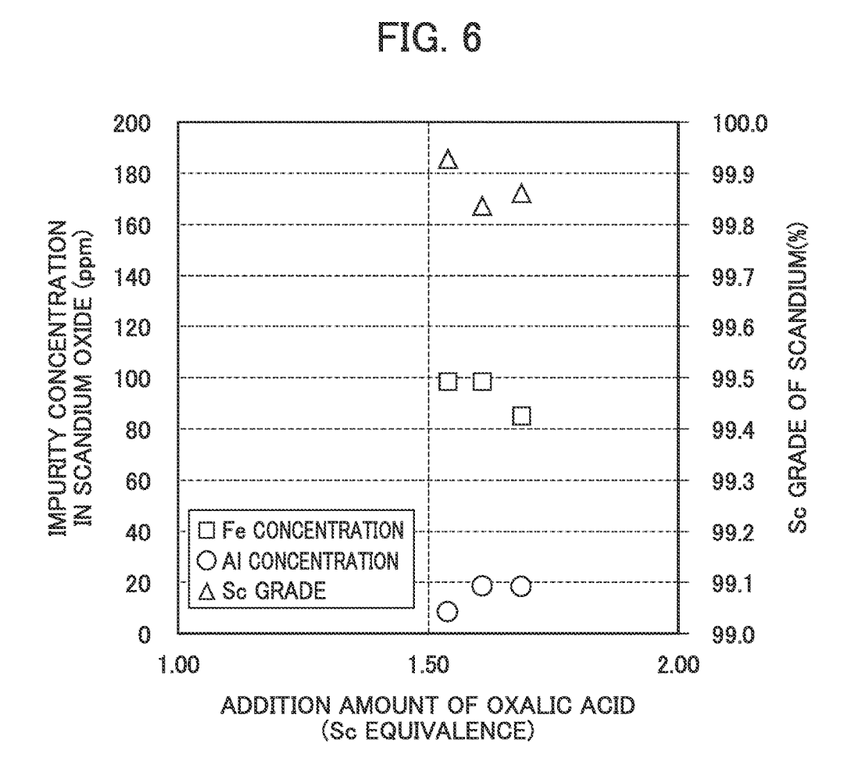
FIG. 6 is a graphic representation showing the measurement results of the impurity concentration with respect to the addition amount of oxalic acid and the grade of scandium for scandium oxide obtained in Comparative Example 1.

As shown in Table 4, the grade of aluminum in each scandium oxide obtained in Comparative Example 1 was 9 to 19 ppm, which is a little higher than that in Examples, the grade of iron was 86 ppm to 99 ppm, which is higher than in Examples, and the grade of scandium oxide did not reach 99.9% in some cases. Note that a graphic representation showing the measurement results of the impurity concentration with respect to the addition amount of oxalic acid and the grade of scandium for scandium oxide obtained in Comparative Example 1 is illustrated in FIG. 6.

Comparative Example 2

In Comparative Example 2, the same scandium-containing solution (having a composition shown in Table 1) as in Example 1 was used, the pH of the solution was not adjusted so as to be kept at 1, and by using the same method as in Example 1 other than this, a scandium-containing solution was added to each of the oxalic acid solutions in 1.3, 1.6, 1.8, 2.1, and 3.4 equivalences of scandium in the scandium-containing solution to perform the oxalate-formation treatment. Thereafter, the resulting crystals of scandium oxalate were roasted to obtain scandium oxide. In the same manner as in Example 1, the metal concentration in the resulting scandium oxide was measured. Measurement results are shown in Table 5. Note that the term "−" in Table 5 indicates that it is not analyzed.

TABLE 5

Measurement of metal concentration in scandium oxide

| Amount of oxalic acid solution (Equivalence) | 1.3 | 1.6 | 1.8 | 2.1 | 3.4 |
|---|---|---|---|---|---|
| $Sc_2O_3$[wt %] | — | 99.85 | 99.86 | 99.86 | — |
| Fe[ppm] | 43 | 86 | 100 | 86 | 57 |
| Al [ppm] | 95 | 435 | 265 | 265 | 38 |

As shown in Table 5, in most of scandium oxide obtained in Comparative Example 1, the grade of iron was about 100 ppm and the grade of aluminum was several hundred ppm. As a result, the purity of resulting scandium oxide was not as high as 99.9%.

Consequently, it has been found that it is important to control the pH of the scandium-containing solution to less than 1 when adding a scandium-containing solution to an oxalic acid solution filled in a reaction tank in the oxalate-formation treatment.

Figure 7:
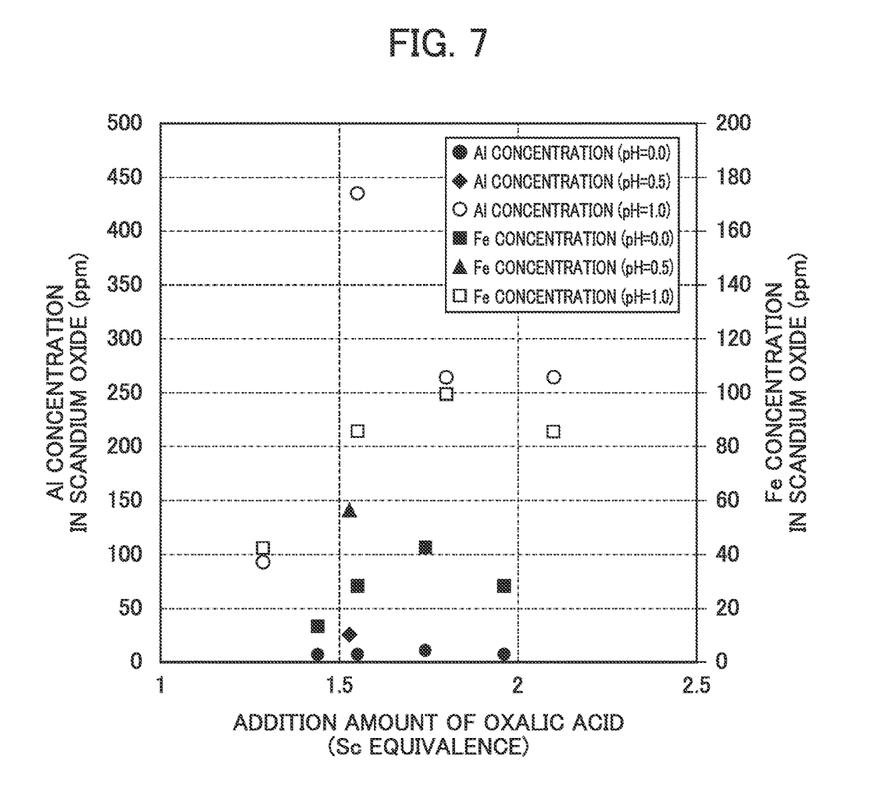
FIG. 7 is a graphic representation showing the measurement results of the impurity concentration with respect to the addition amount of oxalic acid and the grade of scandium for scandium oxide (generated using scandium-containing solutions at a pH of 0, 0.5, and 1.0).

Note that a graphic representation showing the measurement results of the concentrations of Fe and Al which are impurities with respect to the addition amount of oxalic acid for scandium oxide obtained in each of the cases in which a scandium-containing solution of which the pH is adjusted to 0 is added to an oxalic acid solution (Example 1), a scandium-containing solution of which the pH is adjusted to 0.5 is added to an oxalic acid solution (Example 2), and a scandium-containing solution of which the pH is not adjusted but is kept at 1 is added to an oxalic acid solution (Comparative Example 1) is illustrated in FIG. 7.

The invention claimed is:

1. A method for recovering scandium, comprising:
adjusting pH of a solution containing scandium and iron to a range of 0.5 to less than 1 wherein the scandium-containing solution contains divalent iron ions;
adding the solution after the pH adjustment to an oxalic acid solution filled in a reaction vessel to obtain scandium oxalate; and
roasting the scandium oxalate to convert the scandium oxalate into scandium oxide.

2. The method for recovering scandium according to claim 1, wherein the scandium-containing solution before the pH adjustment is obtained by subjecting a solution containing scandium to an ion exchange treatment and a solvent extraction treatment.

3. The method of recovering scandium according to claim 1, wherein in adding the solution after the pH adjustment to the oxalic acid solution, when the amount of oxalic acid required to convert scandium into scandium oxalate is defined as 1 equivalence, the amount of the oxalic acid solution is set to be in the range of 1.4 equivalence to 2.0 equivalences of scandium contained in the scandium-containing solution.

* * * * *